(No Model.) 2 Sheets—Sheet 1.
L. C. EVANS.
PLANTER.
No. 526,521. Patented Sept. 25, 1894.
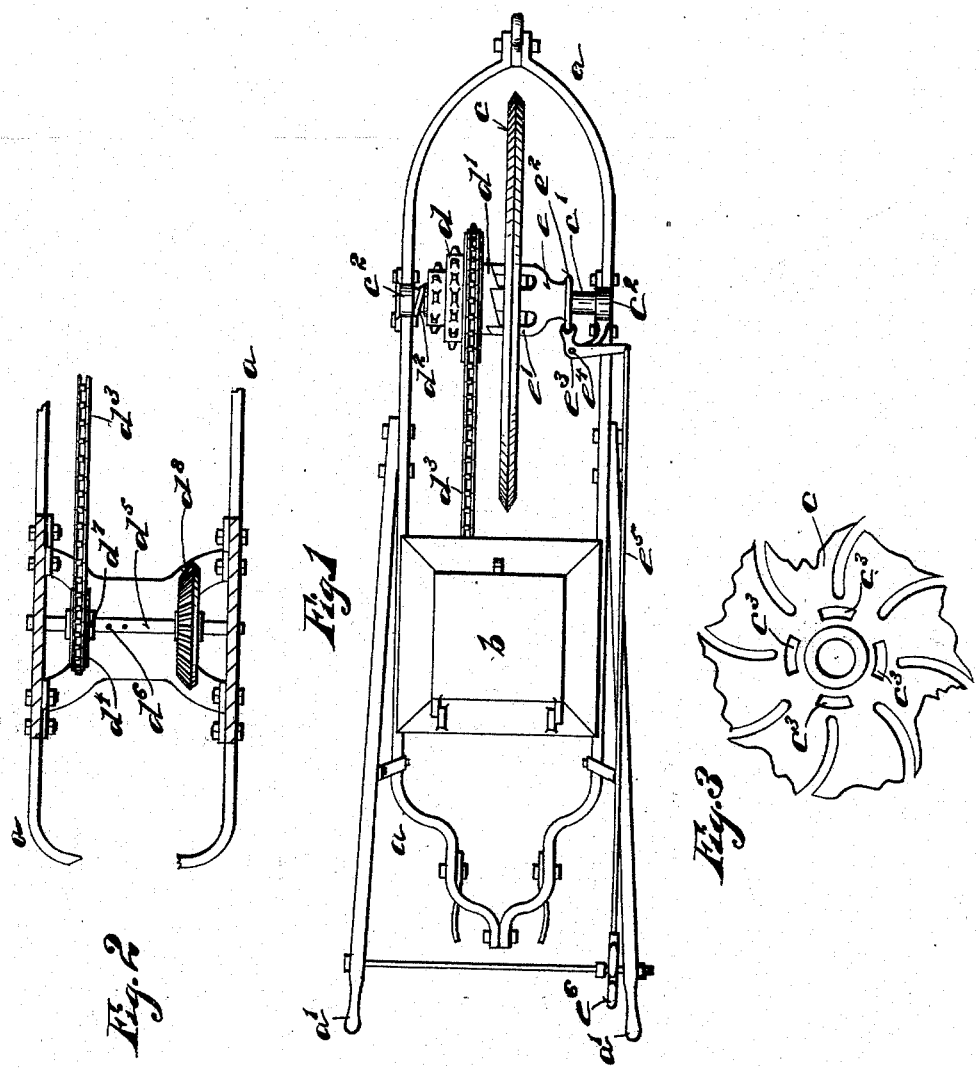
WITNESSES:
Fred Ernest
Chas. J. Welch
INVENTOR
Louis C. Evans
BY
ATTORNEYS

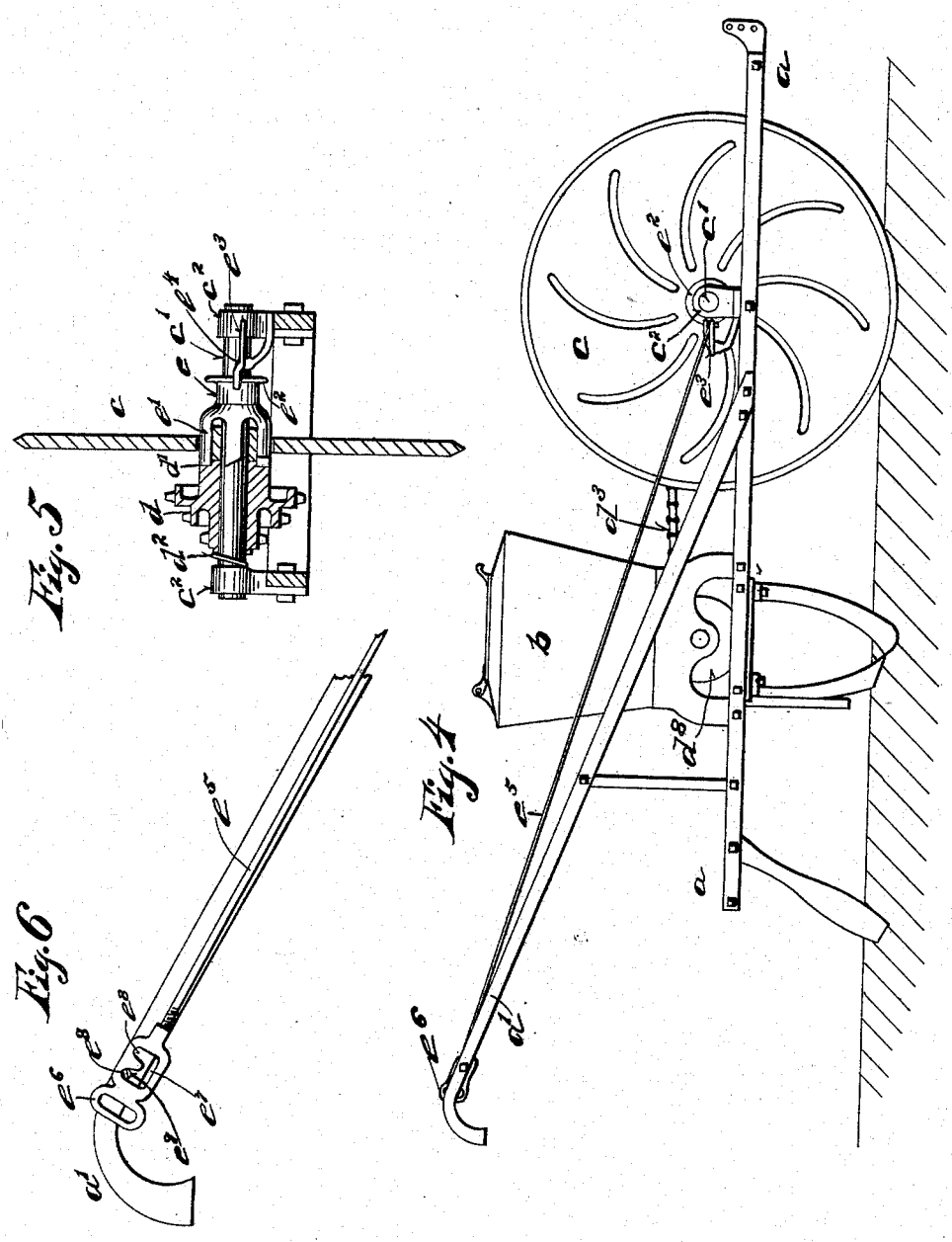

UNITED STATES PATENT OFFICE.

LOUIS C. EVANS, OF SPRINGFIELD, OHIO.

PLANTER.

SPECIFICATION forming part of Letters Patent No. 526,521, dated September 25, 1894.

Application filed June 13, 1894. Serial No. 514,363. (No model.)

*To all whom it may concern:*

Be it known that I, LOUIS C. EVANS, a citizen of the United States, residing at Springfield, in the county of Clark and State of Ohio, have invented certain new and useful Improvements in Planters, of which the following is a specification.

My invention relates to improvements in planters, and it especially relates to one horse planters of the drill type.

The object of my invention is to provide a simple, cheap and effective method of driving the seed mechanism, the driving devices being capable of adjustment so as to readily shift the same so as to throw the seed devices in or out of gear, and at the same time be capable of adjustment to drive the feeding devices at different rates of speed. I attain these objects by the constructions shown in the accompanying drawings, in which—

Figure 1 is a plan view of a device embodying my invention. Fig. 2 is a partial plan view of a portion of the frame showing a portion of the driving connections. Fig. 3 is a detail view of the driving wheel. Fig. 4 is a side elevation of the planter. Fig. 5 is a sectional view through the main shaft and driving wheel, and Fig. 6 a detail view of a portion of the clutch operating mechanism.

Like parts are represented by similar letters of reference throughout the several views.

In the said drawings, $a\ a$ represent a frame, which is preferably formed of iron and is adapted to support all the operating parts.

$b$ is a seed hopper and $c$, the driving wheel; $a'\ a'$ being handles connected to the frame for guiding the planter in the usual manner. The main driving wheel $c$ is secured to a shaft $c'$, which is journaled at each end in suitable bearings $c^2$ secured to the main frame $a\ a$. On this shaft $c'$ is mounted loosely a cone-shaped sprocket wheel $d$, having a series of driving perimeters constituting in effect sprocket wheels of different diameters. This cone-shaped sprocket $d$, as before stated, is placed loosely on the shaft, and is formed at one side with a clutch face $d'$ and on the other side with a spring $d^2$. The end of the cone-shaped sprocket, which is provided with a clutch face $d'$, rests in its normal condition against the hub of the wheel $c$, in which position it is firmly held by the spring $d^2$. A sprocket chain $d^3$ is adapted to communicate motion from the cone-shaped sprocket device to a sprocket wheel $d^4$ on a countershaft $d^5$, arranged in suitable bearings under the hopper $b$, and provided with a beveled gear $d^8$, which meshes with a suitable gear on the seed plate in the usual way so as to communicate motion thereto.

The sprocket wheel $d^4$ is mounted adjustably on the shaft $d^5$, which is provided with a series of openings $d^6$; a pin $d^7$ passing through the hub of the sprocket wheel $d^4$ being adapted to secure said sprocket wheel in different positions of adjustment corresponding to the different holes $d^6$, so as to bring said sprocket wheel $d^4$ in line with either of the driving faces of the cone $d$; the chain $d^3$ being adapted to be shifted to the different driving faces so as to rotate the shaft $d^5$ at different speeds in relation to the driving wheel, the chain being lengthened or shortened to fit the sprockets of different diameters by inserting or removing one or more links in the ordinary manner, the chain employed being the usual detachable link sprocket chain in common use.

In order to provide means for throwing the driving mechanism in or out of gear, and at the same time accommodate the cone-shaped sprocket and retain the driving shaft $c$ in a central position within the frame, I employ a peculiarly shaped clutch device, which consists essentially of a spider $e$, having a series of clutch fingers $e'$, which project outwardly from a main hub or body and are beveled at their outer ends to correspond to the clutch face $d'$ on the end of the cone-shaped sprocket $d$. This spider $e$ is further provided at the other end with a disk $e^2$, which is embraced at one side by the bifurcated end of a bell-crank lever $e^3$, pivoted at $e^4$ to a suitable support on the frame $a\ a$, and connected at the other end to a rod $e^5$, which extends backwardly and is provided with a handle $e^6$ in proximity to one of the handles $a'$. This handle $e^6$ is further provided with an opening $e^7$, having notched depressions $e^8$ therein, adapted to engage with a pin $e^9$ on the handle $a'$ and hold said handle in different positions of longitudinal adjustment.

The driving wheel $c$, around the hub thereof, is provided with a series of openings $c^3$, corresponding in shape and size to the fingers $e'$ of the spider $e$, said fingers being adapted to be reciprocated through said openings so as to contact with the clutch faces or to be withdrawn therefrom as desired. It will be seen now, that by lifting the rod $e^5$ longitudinally by means of the handle $e^6$, the bell-crank lever $e^3$ will operate on the disk $e^2$ so as to withdraw the clutch fingers through the openings $c^3$ of the wheel $c$, and thus disengage the clutch face $d'$ of the cone-shaped sprocket, and thus permit the cone-shaped sprocket to remain stationary while the wheel shaft and clutch and spider continue to revolve.

The construction described readily enables the driving wheel $c$ to turn backward without affecting the seeding mechanism, as in this case the cone-shaped sprocket will yield and permit the clutch face to ratchet in a well-known manner so long as the wheel revolves in this direction; the clutch face being adapted to engage and cause the intermeshing parts to revolve together when moved in the opposite direction.

Having thus described my invention, I claim—

1. In a planter as described, the combination with a supporting and driving wheel mounted on a shaft in suitable bearings, a cone-shaped sprocket on said shaft adjacent to said driving wheel, and a clutch face on said cone-shaped sprocket, a spider having projecting fingers corresponding to said clutch face, and openings in said driving wheel to correspond to the fingers of said spider, and a bell-crank lever connected to said spider and adapted to impart longitudinal movement thereto through the driving wheel to cause the clutch fingers of said spider to engage or disengage the clutch face on said cone-shaped sprocket, substantially as specified.

2. In a planter, the combination with a main shaft, and a countershaft, as described, a driving wheel on said main shaft and gearing on said countershaft adapted to communicate motion to the seeding devices, a cone-shaped sprocket on said main shaft, and an adjustable sprocket wheel on said countershaft, a sprocket chain passing over the sprocket devices on the respective shafts, a clutch face on one end of said cone-shaped sprocket normally in contact with the hub of said driving wheel, and a spring on the opposite end of said sprocket which is loosely mounted on the main shaft, a clutch spider having projecting fingers extending through openings in the driving wheel so as to engage said clutch face, a disk or flange on said spider, a bell-crank lever adapted to engage said disk or flange, and means for operating said bell-crank lever, substantially as specified.

3. The combination with a main shaft, and a driving wheel mounted thereon, a sprocket wheel mounted loosely on said shaft and held in contact with the hub of the driving wheel by means of a spring, as described, a clutch face on said sprocket wheel, a spider having projecting fingers and passing through corresponding openings in the driving wheel, a circular flange on said spider, a bifurcated bell-crank lever to engage said flange, a connecting rod from said bell-crank lever to a handle, and means, as described, for holding said handle in different positions of adjustment, substantially as specified.

In testimony whereof I have hereunto set my hand this 8th day of June, A. D. 1894.

LOUIS C. EVANS.

Witnesses:
ROBERT C. RODGERS,
CHAS. I. WELCH.